June 16, 1936. H. J. L. FRANK ET AL Re. 20,005

DUCT FOR CURRENT DISTRIBUTING SYSTEMS

Original Filed July 28, 1930 3 Sheets-Sheet 1

INVENTORS
Harrison J. L. Frank
and William A. Harper
BY Francis D. Hardesty
ATTORNEY.

June 16, 1936. H. J. L. FRANK ET AL Re. 20,005
DUCT FOR CURRENT DISTRIBUTING SYSTEMS
Original Filed July 28, 1930 3 Sheets-Sheet 2
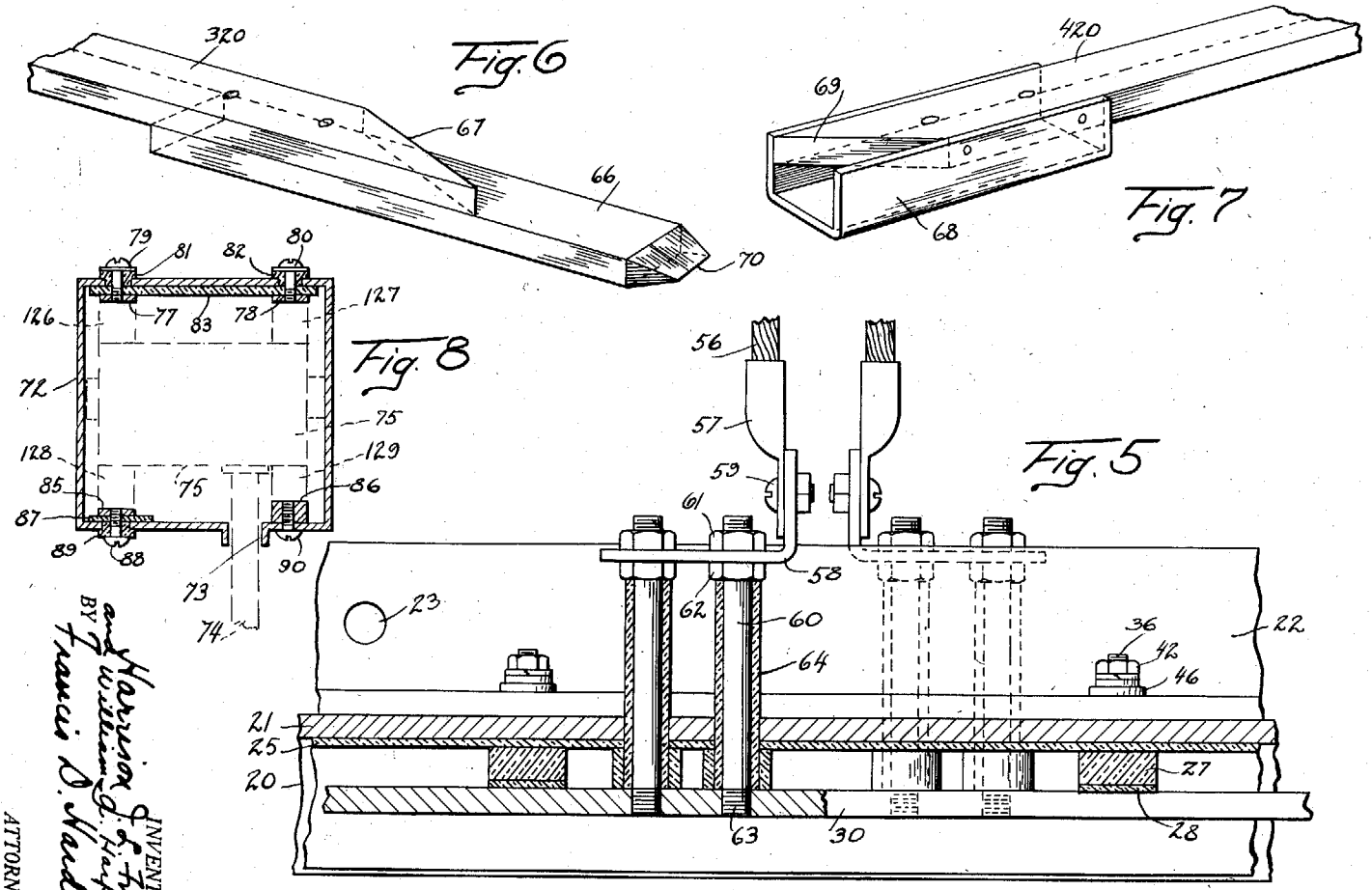
INVENTORS.
Harrison J. L. Frank
and William G. Harper
BY Francis D. Hardcastle
ATTORNEY.

DUCT FOR CURRENT DISTRIBUTING SYSTEMS

Original Filed July 28, 1930 3 Sheets-Sheet 3

INVENTORS
Harrison J. L. Frank
BY and William G. Harper
Francis D. Hardisty
ATTORNEY.

Reissued June 16, 1936

Re. 20,005

UNITED STATES PATENT OFFICE 20,005

DUCT FOR CURRENT DISTRIBUTING SYSTEMS

Harrison J. L. Frank and William A. Harper, Detroit, Mich., assignors to Bulldog Electric Products Company, Detroit, Mich., a corporation of West Virginia Original No. 1,819,885, dated August 18, 1931, Serial No. 471,381, July 28, 1930. Application for reissue July 29, 1932, Serial No. 632,874

21 Claims. (Cl. 247—3)

This invention relates to current distribution systems and more particularly to means for distributing current from one part of a factory building to another, and it is to be understood that this case is to be considered along with the copending reissue application of Harrison J. L. Frank and William A. Harper, Serial No. 471,382, filed July 28, 1930. This application relates to the ducts which enclose the bus bars from which current is to be taken while the said application, Serial No. 471,382 relates to the trolleys for withdrawing current from the distributors disclosed in this application.

It has been the practice, heretofore, in factory installations, to install at conveniently located points, outlets from which current may be taken by means of plug-in devices secured to cords leading from electrically driven tools. Such installations are extremely disadvantageous in certain types of work, especially those wherein it is necessary for a factory worker, having an electrically driven tool in his hand, to go from one place to another while the tool is operating. It has been found desirable to provide a trolley system such that the worker can move his electrically driven tool along with the work, all the while withdrawing current, without interruption, and without snagging or short-circuiting the cords.

An object of this invention, therefore, is a means from which current can be taken "on the run."

A further object is a means of the character described above including tool supporting means such as a rail device upon which the tool and its supports are adapted to be moved along with the work.

A further object is a current distributor including an inverted U-shaped channel member having bus bars therein from which current can be taken, the channel member serving as a rail upon which can move wheels connected to the tool in a manner to support the latter.

A further object is a novel form of connection between bus bars enclosed in a channel member, the connection being mechanically secure and electrically insulated, wherever desired.

A still further object is a current distributor of the type described above provided with means to prevent insertion of the tool in any but the proper direction, whereby to prevent the tool from being subjected to improper electrical influences.

A still further object is a novel form of connection between adjacent aligned sections of a current distributor system, the section being mechanically and electrically efficient.

A still further object is a connection of the character described above which is so formed as to insure against interruptions of the electric current as it flows from one bus to another.

A still further object is a novel form of connection between adjacent ends of bus bars, one which includes male and female members adapted to prevent interruption of current flow in a device as the latter is being moved along said bus bars.

A still further object is a novel form of connection between an entrance cable and a bus bar disposed in a channel or duct member, the connection being mechanically and electrically efficient.

A still further object is a novel form of bus bar enclosing duct, one which is so formed as to provide for the ready insertion and removal of a current collector device and which is so formed as to prevent insertion of the device in any but the proper direction.

A further object is a current distributor of the type described above wherein a maximum clearance between parts of opposite or different polarity is provided, this feature being desirable in such devices due to the presence of dust and loose particles of conducting material.

A still further object is a duct type distributor which is so constructed that it may be made and assembled in units thus permitting rapid assembly and fabrication of various lengths and types of installations.

A still further object, as a subordinate to the foregoing object, is a construction of the aforesaid character wherein the bus bar ends and the section ends are equipped with formations providing joints, these combining readily and automatically to provide a continuous run of bus bar in the distributor, the joints being smooth and non-protruding so that no interruption of a smooth bus-run or rail is presented. This feature is particularly desirable in connection with ducts with which are used trolley type collectors, such as those here disclosed.

Still other objects will readily occur to those skilled in the art upon reference to the following description and the accompanying drawings in which Fig. 1 is a cross section view of one form of the distributor.

Fig. 5 is a cross section view showing the electrical and mechanical connection between an entrance cable and the distributor.

Figs. 6 and 7 show complementary ends of adjacent aligned bus bars.

Fig. 8 is a cross section view of a modification.

*Channel type*

Figure 1:
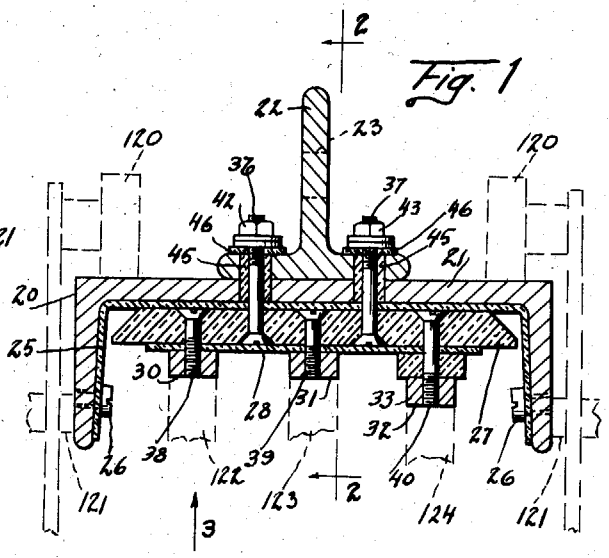
Figure 2:
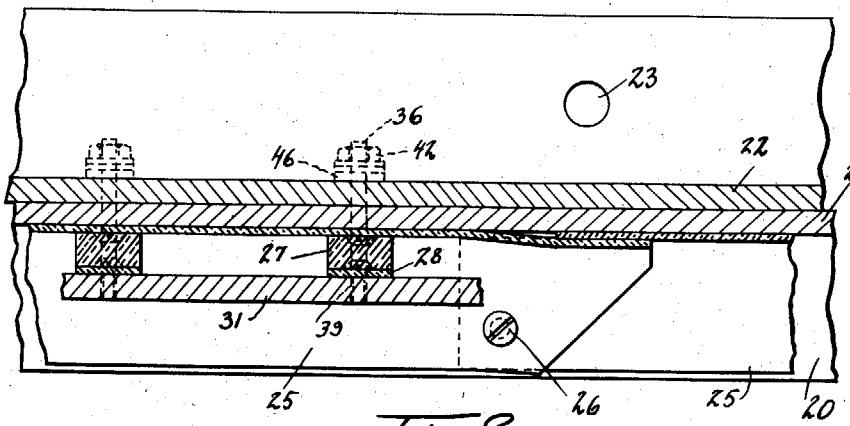
Fig. 2 is an elongated cross section view as if on the line 2—2 of Fig. 1.

The channel type of distributor, shown in Figs. 1 to 7 inclusive, includes a structural steel channel 20 to whose web portion 21 is secured a structural steel angle 22, the latter being perforated as at 23 for the reception of suitable hangers or supports (not shown) whereby the distributor may be secured immediately below the ceiling or other overhead surface of a factory building.

The inside of the channel is lined with an insulating fibre channel or liner 25 secured thereto by means of bolts 26. At regularly spaced intervals there is secured to the web 21, cleats 27 made of a suitable insulating material such as wood, fiber, or the like, and to the under surface of the latter is secured the insulating strip 28 under and against which are disposed the three phase bus bars 30, 31, and 32, the latter being spaced from strip 28 by insulating washers 33, whereby it is below the level of the busses 30 and 31 for reasons to be hereinafter described.

An important feature of this invention is the novel form and method of connection between the parts heretofore described. Bolts 36—37 which secure the cleats 27 to the web 21 are inserted upwardly through apertures in the cleats, strip 28 serving to hold them in place. Bolts 38, 39, 40 securing the buses to the cleats, are then inserted downwardly through apertures in the latter and threaded into apertures in the buses, passing through suitably provided apertures in the strip 28.

It will be observed that the cleats, the buses, the strip 28, and the bolts are assembled to form a unit whereupon they may be mounted in the channel 20 in a very simple and expeditious manner, that is to say, merely by inserting bolts 36—37 through the webs aforesaid whereupon nuts 42 and 43 are threaded on the opposite ends thereof to secure the unit in place.

Further, it will be seen that bolts 36 and 37 are insulated from the webs by means of the fiber bushings 45 and the fiber washers 46.

It will be observed that when once secured in place, access to any or all of the bolts from the under surface of the channel is prevented, thus eliminating any possibility of shortcircuiting or loosening of the parts.

Furthermore, it will be observed that the insulation between electrical conducting parts of opposite polarity is complete and efficient there being no loosely disposed conducting or insulating parts to interfere with proper operation of the device.

Figure 4:
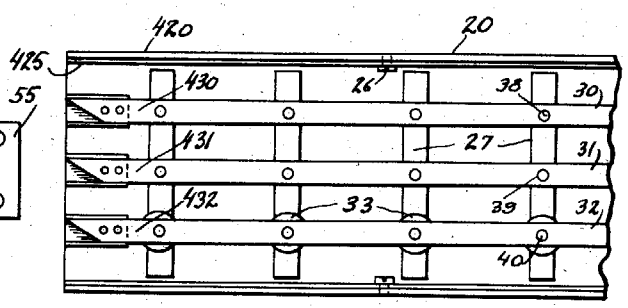
Fig. 4 is a similar view of a complementary section end.
Figure 3:
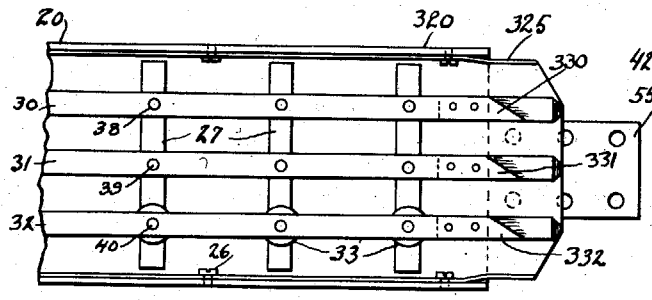
Fig. 3 is a view of a section end, as if in the direction of the arrow 3 of Fig. 1.

Another feature of this form of distributor resides in the connection between adjacent ends of aligned sections and is disclosed best in Figs. 3 and 4. In Fig. 3 the channel end 320 is shorter than its insulating liner 325 which is inbent as shown, whereby, when channel ends 320 and 420 are brought together liner 325 will underlap liner 425, providing a lap joint which prevents exposure from within the channel of any surfaces of the latter. Bus ends 330—331—332 are also extended beyond the end of channel 320 whereby they may be projected within the socketed ends of bus ends 430—431—432, the connection between these buses being illustrated in Figs. 6 and 7 and being later described.

A strip 55 bolted, riveted, or welded to the upper surface of the web channel end 320 or integral with the T-section 22 of Fig. 1 is then secured in a similar fashion to the web of channel end 420, mechanically securing channel ends 320 and 420 to each other and also effecting electrical connection between them for grounding purposes.

In Fig. 5, there is disclosed a means for effecting electrical and mechanical connection between an entrance cable and anyone of the bus bars disposed within the channel. The cable 56 at its end is equipped with a cable lug or terminal 57 which is bolted or otherwise secured to a connection lug 58 by means of the nut and bolt device shown at 59.

Further, it will be observed that a considerable clearance between the bus bars and the channel, as well as between adjacent bus bars has been provided, these clearances being maintained by the extremely sturdy construction of the bus bars and the cleats 27.

Further, it is contemplated to secure only every third bus cleat to the channel, in order to permit relatively slight movement of the bus bars with respect to the rigid channel, such movement being caused by the warping of the copper bus bars due to heat, copper having a different coefficient of expansion than the steel of the channel. This construction also permits facile assembly of units despite the unavoidable and usual manufacturing irregularities, it being necessary to aline only every third cleat 27 with the bolt receiving apertures in the channel.

It also will be seen that this construction, while it permits slight flexing of the bus bars, in a vertical plane with respect to the channel, in no way interferes with proper current collection, since it is contemplated to use therewith current collector rollers having a not inconsiderable amount of play or movement.

Lug 58 is then secured to bolts 60 by means of the complementary nuts 61 and 62 between which it is clamped, the lower end 63 of bolt 60 being threaded into a bus 30 as shown, there being a fiber sleeve or tube 64 surrounding the bolt 60 and clamped between the bus 30 and the lower nut 62, the sleeve 64 serving to insulate the bolt 60 from the web 21 of the channel 20 as shown.

The novel form of connection between complementary ends of adjacent aligned bus bars, illustrated in Figs. 6 and 7, comprises a male member 66 secured by welding to the end of the bus bar 320 the latter being scarfed at 67 for purposes to be described. The bus bar end 420 is provided with a channel member 68 secured thereto on the side thereof by bolts or by welding, as desired, the bus 420 being scarfed as at 69 in the same direction as is scarfed the bus 320. The male member 66 is inserted in the channel 68, its end being pointed as at 70 to facilitate such insertion, until scarves 67 and 69 abut or are adjacent each other on their vertical surface.

In this manner channel ends 320 and 420 overlap and underlap each other, whereby current flow from one to the other is effected without interruption and whereby the current collector which engages the buses on their smooth surface, can pass from bus end 320 to bus end 420 without having its current collection interrupted even for a moment, the collector being in contact with bus end 320 or bus end 420 or both at all times during its travel from one to the other.

Further, by virtue of the flat angle or scarfed formation of the bus bar ends, alined bars may be spaced apart for even a considerable distance without creating such a gap as will cause a roller passing thereover to be "bumped", the scarves causing a roller to be in supported engagement with one or the other of the bus bars at all times.

Further, the provision of the particular type of scarfed joint disclosed assures bus bar ends being joined in such a fashion as to provide a smooth and non-interrupted bus run or rail, particularly adapted for trolley use.

*Duct types*

In Fig. 8 there is disclosed a distributor including a metallic duct 72 substantially rectangular in cross section and provided with an asymmetrically disposed slot 73 through which may extend the handle 74 secured to the collector head 75. To the duct, on the under surface of the top thereof, buses 77 and 78 are secured by means of the bolts 79 and 80, the latter being insulated from the duct by means of insulating bushings 81 and 82, there being an insulating strip 83 between the buses and duct 72. Also inside the duct but to the top surface of the bottom portion thereof are secured buses 85 and 86, the bus 85 being insulated from the duct 72 by the strip 87 and its securing bolts 88 being insulated from the duct by the bushings 89. Bus 86, however, is permitted to electrically contact the duct 72 for grounding purposes, there being an uninsulated bolt 90 which secures the bus 86 to the duct. It is to be understood that buses 77, 78, and 85 are three phase buses, and bus 86 is a grounding bus.

Figure 10:
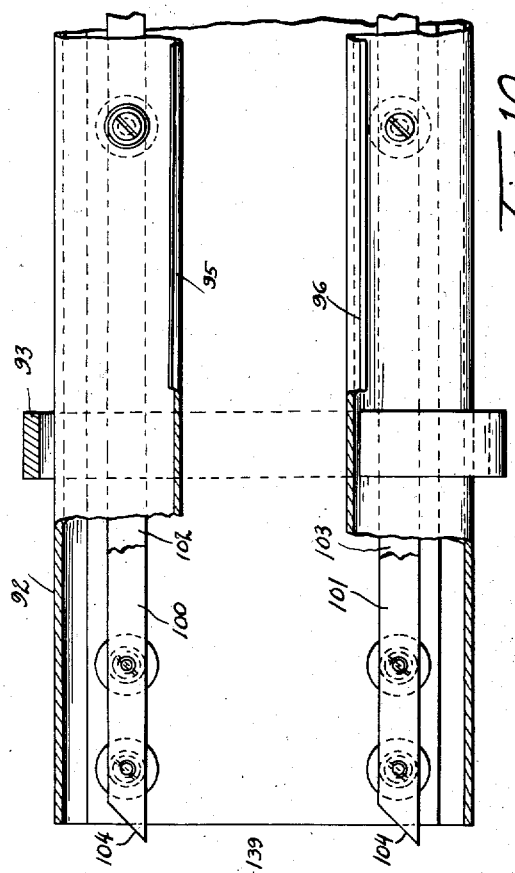
Fig. 10 is a view of the modification of Fig. 9 as if in the direction of the arrow 10 thereof.
Figure 9:
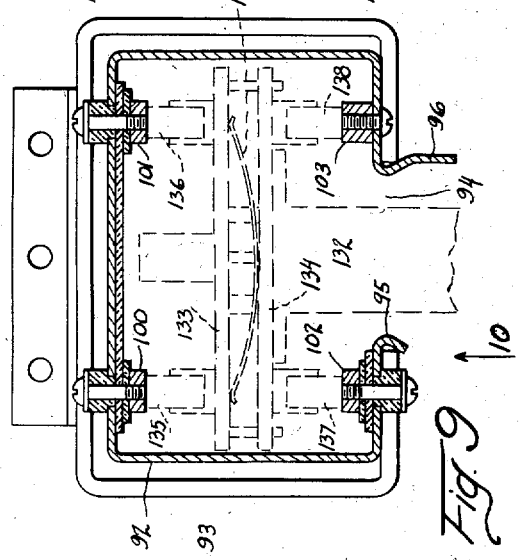
Fig. 9 is a cross section view of another modification.
Figure 11:
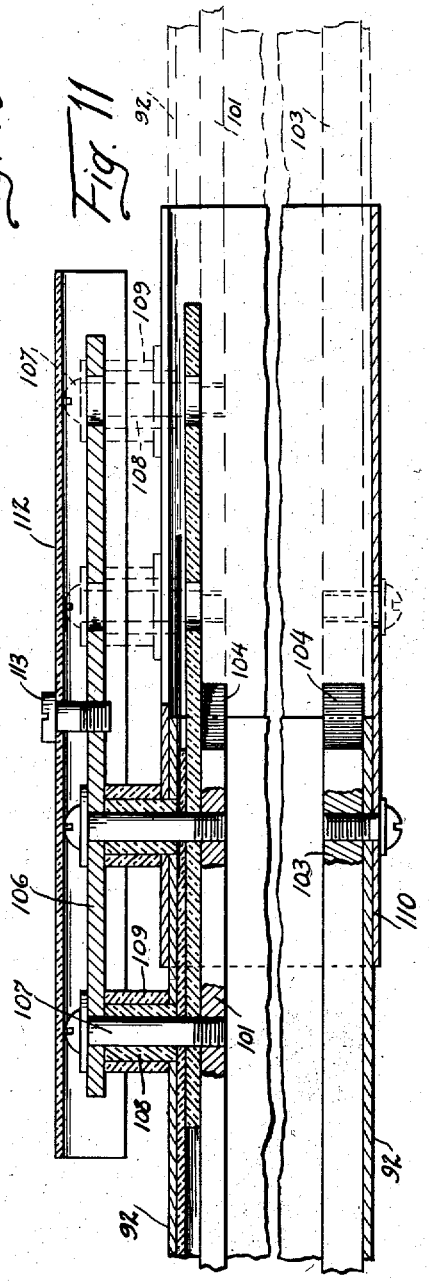
Fig. 11 is a cross section view showing a mechanical and electrical connection between adjacent ends of sections like those of Fig. 9.

Another form of duct type of distributor, illustrated in Figs. 9 to 11 inclusive, includes a metallic duct 92 which is adapted to be secured to an overhead surface by means of the stirrups and hangers 93 disposed at spaced intervals along the duct. The latter is slotted in its lower surface as at 94, edge 95 of the slot being flanged inwardly, and edge 96 being also flanged but for a considerably greater distance than is edge 95, for purposes to be described.

Secured within the duct by means and in a manner resembling the securing means of the form of Fig. 8 and therefore not specifically described, are buses 100—101—102 and 103 inclusive, the threephase buses 100—101—102 being insulated from the duct 92 and the grounding bus 103 being in electrical contact with the duct 92 as shown, the ends of all of the buses being scarfed as shown at 104, Fig. 10, for reasons previously described.

In Fig. 11 there is shown a connection between adjacent sections of duct, the connection including a metallic strip 106 which is bolted to adjacent buses 101 by means of bolts 107, the latter being insulated from the duct by the fiber tubes 108 and 109. Adjacent ends of the ducts are connected by means of the lap joint disclosed in Fig. 11 and which is created by enlarging an end of one duct so that it overlaps and receives an end of its neighbor, as shown at 110. If desired, an insulating shield 112 may be secured to the strip 106 by means of the bolt 113 whereby electrical exposure of the strip is prevented.

*Use*

The modus operandi or use of the distributor disclosed will now be described.

The distributor of Fig. 1, namely, the channel type is adapted to be used with a collector having wheels at 120 which ride on the top surface of the web 21, the collector having rollers at 121 which engage the flanges of channel 20 to prevent side sway or thrust, the collectors also having a plurality of roller contacts 122—123—124 which roll along the under surface of busses 30—31—32 respectively, gathering current therefrom and leading it to cables disposed on the collector and not shown.

It will be observed that bus bar 32 and collector 124 are displaced with respect to the corresponding busses and collectors for insuring proper insertion of the collector in the channel. For example, if the collector be inserted in the channel with its contact 122, under bus 32, no damage will be done since the remaining contacts are out of engagement with the remaining buses and since no circuit is completed through the device fed by the collector. It is impossible for the collector to be left in this position since the rollers 120 will not come to rest upon the web 21 and the operator of the collector will, therefore, immediatey see that he has inserted it in its wrong position and will rotate it 180 degrees on its vertical axis until contact 124 is beneath bus 32 whereupon the parts will come together in the proper manner. In this way the feeding of current to the device to be operated in an improper direction is made impossible. Further displacement of a bus bar prevents the insertion of a multi (three) phase current collector in such a position that it will be single-phased, since in reversed position, a collector can change but one bus bar, namely the lower bar 32.

The duct type shown in Fig. 8 is useful practically with installation requiring small currents and/or low voltage. In this type of device the collector is inserted from an open end of the duct or from an enlarged opening in the bottom and is then moved endwise until it enters a duct 72, its handle 74 projecting downwardly through the slot 73 and its contacts 126—127—128—129 engaging buses 77—78—85—86 respectively.

It will be observed that bus 86 is displaced with respect to bus 85 in such a manner as to insure the insertion of the collector 75 in the duct in the proper direction whereby proper current flow will be insured, in a manner resembling that used in the form of Fig. 1.

The duct type illustrated in Fig. 9 is useful with collectors of the character disclosed at 132, the latter comprising two separable halves 133 and 134, each of which is provided with contacts 135, 136, 137, and 138 as shown, and collector 132 being provided with spring means 139 which will cause separation of the halves and engagement of the contacts 135 etc., with the corresponding buses.

In this form also there is provided means for insuring insertion of the collector in the ducts in the proper direction and such means will now be described.

The head of collector 132 is so shaped as to be inserted in the duct 92 through slot 94, that is to say, it is elongated in cross section and can be inserted in the duct only when its long diameter is parallel to the long axis of the duct after which insertion it is rotated 180 degrees. In order to prevent insertion of the collector 132 from the wrong side of the duct, that is to say from the right hand side of Fig. 9, the flange 96 is extended a considerable distance whereas flange 95 is cut off very close to the lower edge of the duct.

It will be observed that the vertical axis of the head of collector 75 of the duct 72 and of the buses 77, 78, 85 and 86, is offset with respect to the axis of the handle 74, thus preventing improper rotation of the collector 75 and insuring contact 129 being disposed immediately above bus 86.

While only three modifications of the distribution system have been shown and described, it is observed that many other modifications of the same can be made and it is to be understood that the scope of this invention is to be measured only by the appended claims and not by the foregoing description.

For example, referring to Fig. 8, duct 72 may be provided with a slot in its vertical side wall to replace the slot in its lower wall, the collector being more or less L-shaped in cross section whereby it can be accommodated by the duct. Further, the channel of Fig. 1 may be replaced by an I-beam or any other structural shape which will be found useful in this connection. Further, other connection means may be found useful with the device and other collectors may be used if desired.

Now having described the invention and the preferred embodiment thereof, it is to be understood that the said invention is to be limited, not to the specific details herein set forth but only by the scope of the claims which follow:

1. A bus bar joint adapted to prevent interruptions of electrical flow in a collector as the later is being passed from one bus bar to another, comprising aligned adjacent and complementary scarfed bus bar ends, a male member secured to one of said bus bars on the non-collecting surface thereof, and a female member secured to the other of said bars away from the collecting surface thereof, said female member being so shaped as to receive said male member when the bus bars are brought together.

2. In a current distributing system, current distributing means comprising a duct substantially rectangular in cross section, the bottom of the duct having an elongated slot, bus bars on opposite sides of said slot and remote therefrom and asymmetrically disposed with respect thereto, the slot being wide enough to permit the insertion into the duct through said slot of a current collector trolley of the type that has an enlarged head provided with collector contacts on opposite sides thereof for engagement with the bus bars between which is the slot and that has a depending portion riding in the slot, improper insertion of a current collector through the slot being prevented by the asymmetrical disposition of the slot with respect to the bus bars.

3. In a current distribution system, current distributing means comprising a duct substantially rectangular in cross section, and having a slot asymmetrically disposed with respect to the duct, and bus bars disposed in said duct on opposite sides of said slot, whereby improper insertion in said duct of a current collector is prevented, one of said bus bars being off the level of the remaining bus bars to form additional means to prevent improper insertion of said bus bars.

4. In a current distribution system, a plurality of aligned elongated ducts having elongated bus bars therein, and means for electrically and mechanically connecting said ducts and bus bars, said means including metallic bolts threaded in adjacent ends of aligned bars and through insulated apertures in said ducts, and a strap secured to said bolts and electrically connecting them, there being an insulating shield for said strap.

5. Means for creating electrical connection between a bus bar disposed within a metallic channel, and a cable behind the web of said channel, comprising a bolt threaded into said bus bar through an insulated aperture in said channel web, and having a cable lug secured thereto, said bolt being surrounded by a closely fitting tube of insulating material clamped between said bus bar and one of said nuts.

6. A bus bar joint adapted to prevent interruptions of electrical flow in a collector as the latter is being passed from one bus bar to another, comprising aligned adjacent and complementary scarfed bus bar ends, a male member secured to one of said bus bars on the non-collecting surface thereof, and a female member secured to the other of said bars away from the collecting surface thereof, said female members being so shaped as to receive said male member when the bus bars are brought together, said male member being of the same cross section as the bus to which it is secured.

7. A bus bar joint adapted to prevent interruptions of electrical flow in a collector as the latter is being passed from one bus bar to another, comprising aligned adjacent and complementary scarfed bus bar ends, a male member secured to one of said bus bars on the non-collecting surface thereof, and a female member secured to the other of said bars away from the collecting surface thereof, said female member being so shaped as to receive said male member when the bus bars are brought together and being U-shaped in cross section, the inner dimensions of the U being the same as the outer dimensions of the male member.

8. A current distribution trolley duct system comprising an elongated metallic duct, and sectional bus bars therewithin, the bus bar ends being clear of the duct, and rigid means in the clear space between the bus bar ends and the duct for joining adjacent bus bar ends mechanically and electrically, and preventing relative shifting of the joined ends, the means including a sleeve on the end of one bus bar receiving the end of the adjacent bus bar.

9. A current distribution bus duct comprising a plurality of standard-bus duct sections, each of which includes a standard metallic duct section, a standard insulation liner section therein, and standard bus bar sections therein, adjacent duct sections having their ends joined by means outside of the duct, adjacent liner sections being joined by a lap sealing joint between them, and adjacent bus bar ends being joined by a sleeve on one bus bar end encompassing and adjacent bus bar end.

10. A current distribution bus duct comprising a plurality of standard-bus duct sections, each of which includes a standard metallic duct section, a standard insulation liner section therein, and standard bus bar sections therein, adjacent duct sections having their ends joined by means outside of the duct, adjacent liner sections being joined by a lap sealing joint between them, and adjacent bus bar ends being joined by a sleeve on one bus bar end encompassing an adjacent bus bar end, the sleeve being in a clear space between the bus bar ends and the duct.

11. In a bus duct run, a bus bar, means insulating the latter from the duct, and a single screw in electrical connection with the bus and insulated from the duct for securing the bus and its insulation with respect to the duct, the screw projecting through the duct to present an exposed end by means of which the bus may be electrically supplied.

12. In a bus duct run, adjacent bus bar ends, means insulating them from the duct, a single screw in electrical connection with the bus and insulated from the duct for securing each bus end and its insulation with respect to the duct, each screw projecting through the duct, and means outside of the duct mechanically and electrically interconnecting adjacent screws, to form a rigid continuous bus run and preventing relative shifting of the bus bar ends.

13. In a bus duct run, adjacent bus bar ends, means insulating them from the duct, portions electrically integral with said bus bars and projecting transversely therefrom through holes in said duct and insulated therefrom, and means outside of the duct mechanically and electrically interconnecting adjacent ones of said portions to form a rigid continuous bus run and preventing relative shifting of the bus bar ends.

14. In a trolley bus-rail duct, a bus rail therewithin and lying adjacent a wall thereof, supporting means therefor within the duct and between the bus rail and the wall, and bolts securing said bus rail to said supporting means, the bolts being so positioned that they are threaded into said bus rail first through the means and then into the bus rail, towards the collector surface of the bus rail, the shanks of the bolts terminating at or in back of the collector surface of the bus rail.

15. In a trolley bus-rail duct, a bus rail therewithin and lying adjacent a wall thereof, supporting means therefore within the duct and between the bus rail and the wall, and bolts securing said bus rail to said supporting means, the bolts being so positioned that they are threaded into said bus rail first through the means and then into the bus rail, towards the collector surface of the rail, the shanks of the bolts terminating at or in back of the collector surface of the bus rail, and bolts securing said means to the duct and manipulable independently of the bus rail bolts.

16. A trolley bus duct section comprising a long piece of duct having therein bus bars of substantially the length of the piece of enclosure, insulating means on a surface of the duct between it and the bus bars, sets of screws in line with the bus bars securing them to the insulating means and having their heads between the means and the duct surface, and sets of screws out of the line of the bus bars securing the insulating means to the duct and having their heads exposed to the interior of the duct, and exposed insulating means insulating the heads of the last mentioned screws.

17. A trolley bus duct section comprising a long piece of duct having therein bus bars of substantially the length of the piece of enclosure, insulating means on a surface of the duct between it and the bus bars, sets of screws in line with the bus bars securing them to the insulating means and having their heads between the means and the duct surface, and sets of screws out of the line of the bus bars securing the insulating means to the duct and having their heads exposed to the interior of the duct, and exposed insulating means insulating the heads of the last mentioned screws, the duct having a continuous elongated opening in the wall opposite the aforementioned duct surface providing access to the heads of the last mentioned screws.

18. A trolley bus duct section comprising a long piece of duct having therein bus bars of substantially the length of the piece of enclosure, insulating means on a surface of the duct between it and the bus bars, sets of screws in line with the bus bars securing them to the insulating means and having their heads between the means and the duct surface, and sets of screws out of the line of the bus bars securing the insulating means to the duct and having their heads exposed to the interior of the duct, and exposed insulating means insulating the heads of the last mentioned screws, the first mentioned insulating means being longitudinally spaced transverse cleats providing flexibility for the bus bars between the cleats.

19. A trolley bus duct section comprising a long piece of duct having therein bus bars of substantially the length of the piece of enclosure, insulating means on a surface of the duct between it and the bus bars, sets of screws in line with the bus bars securing them to the insulating means and having their heads between the means and the duct surface, and sets of screws out of the line of the bus bars securing the insulating means to the duct and having their heads exposed to the interior of the duct, and exposed insulating means insulating the heads of the last mentioned screws, the first mentioned insulating means being longitudinally spaced transverse cleats providing flexibility for the bus bars between the cleats, and means between the cleats of adjacent bus duct sections which are joined in end to end relation to form a trolley bus duct run for rigidly joining adjacent bus bar ends, the joining means lapping said bus bar ends and being between the bus bars and the aforementioned duct surface.

20. A trolley bus duct section comprising a long piece of duct having therein bus bars of substantially the length of the piece of enclosure, insulating means on a surface of the duct between it and the bus bars, sets of screws in line with the bus bars securing them to the insulating means and having their heads between the means and the duct surface, and sets of screws out of the line of the bus bars securing the insulating means to the duct and having their heads exposed to the interior of the duct, and exposed insulating means insulating the heads of the last mentioned screws, the first mentioned insulating means being longitudinally spaced transverse cleats providing flexibility for the bus bars between the cleats, and means between the cleats of adjacent bus duct sections which are joined in end to end relation to form a trolley bus duct run for rigidly joining adjacent bus bar ends, the joining means lapping said bus bar ends and being between the bus bars and the aforementioned duct surface, and means outside the adjacent ends of bus duct sections for rigidly joining them.

21. In a trolley bus-rail duct, a bus rail therewithin and lying adjacent a wall thereof, supporting means therefor within the duct and between the bus rail and the wall, and bolts securing said bus rail to said supporting means, the bolts being so positioned that they are threaded into said bus rail first through the means and then into the bus rail, towards the collector surface of the rail, the shanks of the bolts terminating at or in back of the collector surface of the bus rail, and bolts securing said means to the duct and manipulable independently of the bus rail bolts and threaded into the duct first through the means and then through the duct, and being remote from the bus rails.

HARRISON J. L. FRANK.
WILLIAM A. HARPER.